(12) United States Patent
Baptiste

(10) Patent No.: US 9,521,027 B2
(45) Date of Patent: Dec. 13, 2016

(54) METHOD FOR GENERATING SYMBOLS FOR THE AUTOMATIC GAIN CONTROL OF A SIGNAL TO BE TRANSMITTED

(71) Applicant: THALES, Neuilly-sur-Seine (FR)

(72) Inventor: François Baptiste, Gennevilliers (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/575,795

(22) Filed: Dec. 18, 2014

(65) Prior Publication Data
US 2015/0180698 A1 Jun. 25, 2015

(30) Foreign Application Priority Data

Dec. 20, 2013 (FR) ..................................... 13 03031

(51) Int. Cl.
*H04K 1/02* (2006.01)
*H04L 27/36* (2006.01)
*H04L 27/34* (2006.01)
*H04L 25/03* (2006.01)

(52) U.S. Cl.
CPC ....... *H04L 27/366* (2013.01); *H04L 25/03828* (2013.01); *H04L 27/3405* (2013.01)

(58) Field of Classification Search
CPC .. H04L 27/362; H04L 27/366; H04L 27/3828; H04L 27/36; H04L 25/03; H04L 27/34; H04L 25/085; H04L 2025/03388; H04L 2025/03401; H04L 27/18

USPC .......... 375/296, 268, 261, 264, 298
See application file for complete search history.

(56) References Cited

U.S. PATENT DOCUMENTS

| | | | |
|---|---|---|---|
| 6,373,902 B1 * | 4/2002 | Park | H04L 27/367 332/124 |
| 6,584,164 B1 * | 6/2003 | Tuukkanen | H04L 27/2613 370/503 |
| 6,985,099 B1 | 1/2006 | Luz et al. | |
| 2003/0031271 A1 * | 2/2003 | Bozeki | H04L 27/368 375/297 |

FOREIGN PATENT DOCUMENTS

| | | |
|---|---|---|
| EP | 0 886 388 B1 | 8/2006 |
| FR | 2 863 419 A1 | 6/2005 |
| WO | 02/32018 A2 | 4/2002 |
| WO | 03/071695 A1 | 8/2003 |

\* cited by examiner

*Primary Examiner* — Rahel Guarino
(74) *Attorney, Agent, or Firm* — Baker & Hostetler LLP

(57) ABSTRACT

A method for generating a set of symbols, called AGC symbols, for the automatic control of the amplitude of a signal to be transmitted, the signal including the set of AGC symbols and at least one first information symbol modulated with a linear modulation, includes the following steps: recovering at least one modulated information symbol adjacent to the AGC symbols in the signal; and determining each AGC symbol of the set as a function of at least the modulated information symbol.

7 Claims, 5 Drawing Sheets

METHOD FOR GENERATING SYMBOLS FOR THE AUTOMATIC GAIN CONTROL OF A SIGNAL TO BE TRANSMITTED

CROSS-REFERENCE TO RELATED APPLICATION

This application claims priority to foreign French patent application No. FR 1303031, filed on Dec. 20, 2013, the disclosure of which is incorporated by reference in its entirety.

FIELD OF THE INVENTION

The present invention relates to the field of radio communication systems which use, to shape the signal to be transmitted, a linear modulation.

One field linked to that of the invention is that of the automatic gain control of a wireless link. The invention aims notably to facilitate and enhance the automatic gain control.

The invention relates notably to a method for generating symbols for the automatic gain control, said symbols being configured, in amplitude and in phase, to minimize the variation of the power of the signal transmitted over the portion of signal dedicated to the automatic gain control.

BACKGROUND

In many radio communication standards, the signal to be transmitted is formatted in a succession of frames of fixed duration between which no signal is transmitted. Each frame generally begins with a sequence of symbols dedicated to the automatic gain control, hereinafter called AGC symbols, followed by a sequence made up of modulated information symbols.

The AGC symbols enable equipment receiving the transmitted signal to control the level or the power of the received signal so as to demodulate the symbols of the signal with a sufficient signal-to-noise ratio.

To produce the automatic gain control, the power of the transmitted signal over the duration of the AGC sequence has to be substantially constant. In other words, the aim is for the power variations at the start of frame not to be too great to be able to accurately measure the level of the signal. This objective is particularly important for the case of linear modulations for which the gain of the transmitting device as a function of the modulating signal is linear.

Now, when a frame is filtered by a shaping filter before its transmission, the influence of the filtering is such that the first information symbols, which are adjacent to the sequence of AGC symbols, also contribute to the portion dedicated to the automatic gain control in the signal actually transmitted (that is to say after shaping filtering).

Thus, the property sought, to obtain a signal power that is substantially constant at the start of each frame, is not observed.

One problem that the invention seeks to resolve is therefore to find a solution which makes it possible to minimize the amplitude variations of the signal at the start of each frame so as to enhance the accuracy of the power measurements for the automatic gain control.

Automatic gain control methods are notably described in the publications U.S. Pat. No. 6,985,099 and WO2003071695.

These solutions notably have the disadvantage of largely being unparameterizable and use, for the generation of the AGC symbols, heterogeneous modulations with respect to the information symbols. The modulations employed generally exhibit a peak power to average power ratio greater than one, which complicates the implementation of the automatic gain control.

SUMMARY OF THE INVENTION

The invention aims to provide a solution that makes it possible to ensure a minimum amplitude variation of the signal in its portion dedicated to the automatic gain control. In other words, the invention makes it possible to improve the power build-up profile of the start of the signal levels. It applies also for the end-of-level descent profile and, in this case, allows for an enhancement of the spectral quality of the signal.

The subject of the invention is a method for generating a set of symbols, called AGC symbols, for the automatic control of the amplitude of a signal to be transmitted, said signal comprising said set of AGC symbols and at least one first information symbol modulated with a linear modulation, said method comprising the following steps:

selecting at least one modulated information symbol adjacent to said AGC symbols in said signal, determining each AGC symbol of said set as being equal to the result of the application of a mathematical function to at least said modulated information symbol.

According to a particular aspect of the invention, each AGC symbol of said set is determined as follows:

the amplitude of an AGC symbol is equal to a linear function of the amplitude of at least said modulated information symbol, the phase of an AGC symbol is equal to the phase of said modulated information symbol.

According to a particular aspect of the invention, the coefficients of said linear function are configured in such a way as to obtain an amplitude level of the signal that is substantially constant over the portion of the signal corresponding to said AGC symbols filtered by a shaping filter.

According to a particular aspect of the invention, the coefficients of said linear function are determined as a function of the shaping filter and of the desired amplitude level over said portion of the signal.

According to a variant embodiment of the invention, a number of modulated information symbols adjacent to said AGC symbols in said signal are recovered and the amplitude of an AGC symbol is equal to the sum between, on the one hand, a linear function of the amplitude of the first modulated information symbol adjacent to said AGC symbols in said signal and, on the other hand, a sum of linear functions of the amplitude of the other modulated information symbols projected in the direction formed by the phase of said first modulated information symbol.

According to a particular aspect of the invention, said signal is formatted as a plurality of frames, said AGC symbols being positioned at the start or at the end of a frame.

Another subject of the invention is a method for generating a signal to be transmitted, said signal being formatted as a plurality of frames each comprising at least one sequence of AGC symbols obtained by the application of the method for generating symbols according to the invention and a sequence of information symbols modulated by a linear modulation, said AGC symbols and said information symbols being filtered by a shaping filter.

Yet another subject of the invention is a signal to be transmitted obtained by the application of the method for generating a signal according to the invention and a transmitter comprising means configured to implement the method for generating a signal to be transmitted according to the invention.

BRIEF DESCRIPTION OF THE DRAWINGS

Other features and advantages of the present invention will become more apparent on reading the following description in relation to the attached figures which represent.

DETAILED DESCRIPTION

Figure 1:
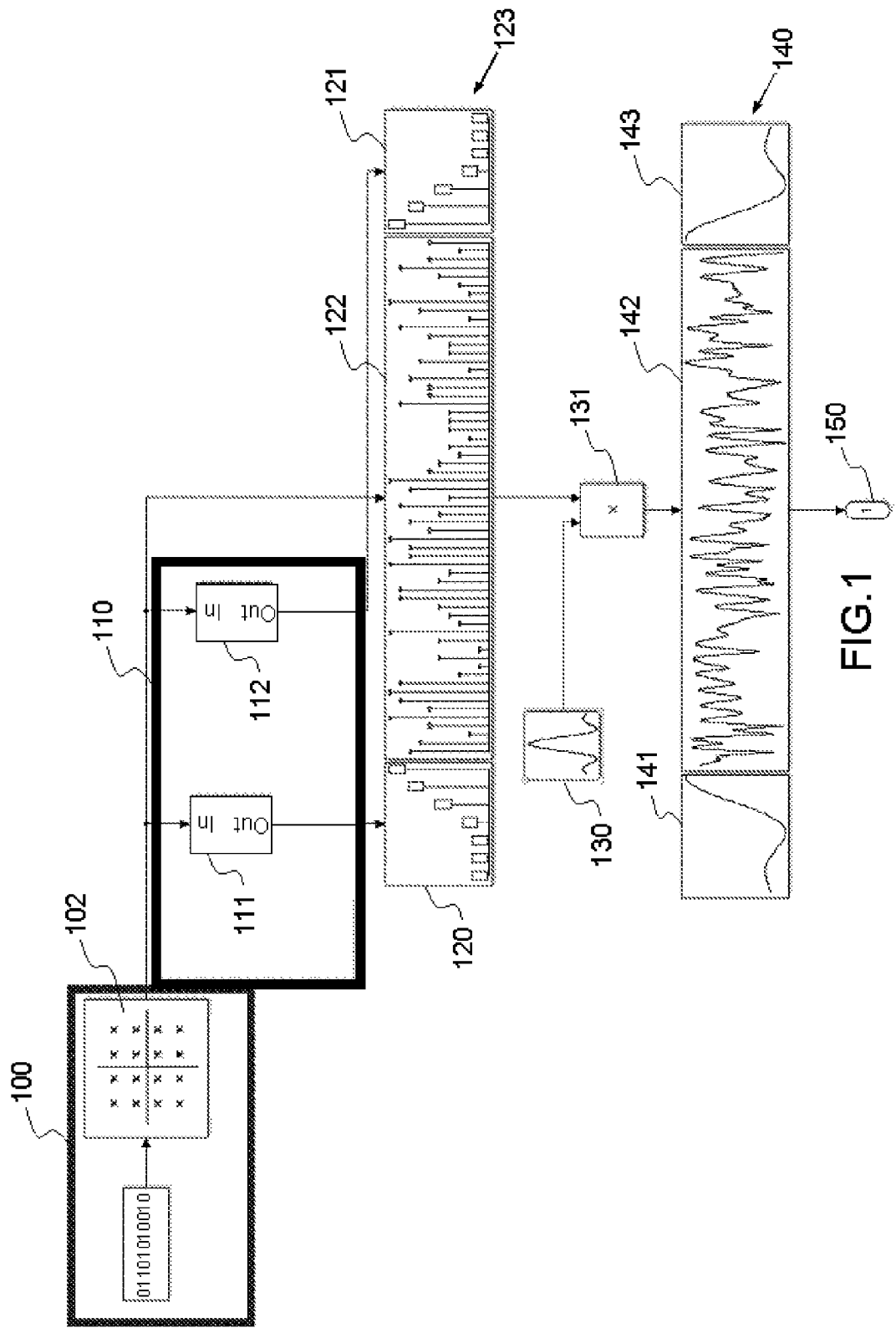
FIG. 1, a diagram illustrating the steps necessary for the generation of a signal comprising a portion dedicated to the automatic gain control in accordance with the method according to the invention, FIG. 2, a diagram illustrating the steps necessary for generating the symbols dedicated to the automatic gain control in a frame of the signal according to a first embodiment, FIG. 3a, a diagram illustrating the steps necessary for generating the symbols dedicated to the automatic gain control in a frame of the signal according to a second embodiment, FIG. 3b, a variant of the second embodiment of the invention, FIGS. 4a and 4b, two illustrations of the amplitude variations of the power build-up profile of a signal generated on the one hand by a prior art method and, on the other hand, by the method according to the invention.

FIG. 1 describes, in a block diagram, the generation, according to the invention, of a communication signal structured according to a succession of frames. The diagram of FIG. 1 illustrates the generation of a signal frame. The transmitted signal is made up of a plurality of concatenated frames.

A binary information sequence 101 is modulated as a sequence of information symbols 102 belonging to a given constellation. The modulation employed can be a phase modulation or amplitude modulation or any other modulation. The generation 100 of modulated information symbols culminates in a sequence 122 of modulated information symbols being obtained.

According to the invention, from the first modulated information symbol or symbols, a set 120 of symbols dedicated to the automatic gain control is generated 111. This set 120 of AGC symbols is positioned at the start of frame, that is to say, before the sequence 122 of information symbols.

According to a variant embodiment of the invention, from the last modulated information symbol or symbols, a set 121 of end-of-frame symbols positioned after the information symbols 122 is also generated 112. These end-of-frame symbols are notably useful for improving the spectral occupancy of the signal and minimizing the impact of the end-of-frame symbols on the spectrum.

The duly constituted sequence of symbols 123 is then temporally convoluted 131 with a shaping filter 130 to obtain a filtered signal 140 ready to be transmitted by an antenna 150. The filtered signal 140 comprises, for each frame, a first portion 141 corresponding to the filtered AGC symbols, a second portion 142 corresponding to the filtered information symbols and a third portion 143 corresponding to the filtered end-of-frame symbols.

Figure 2:
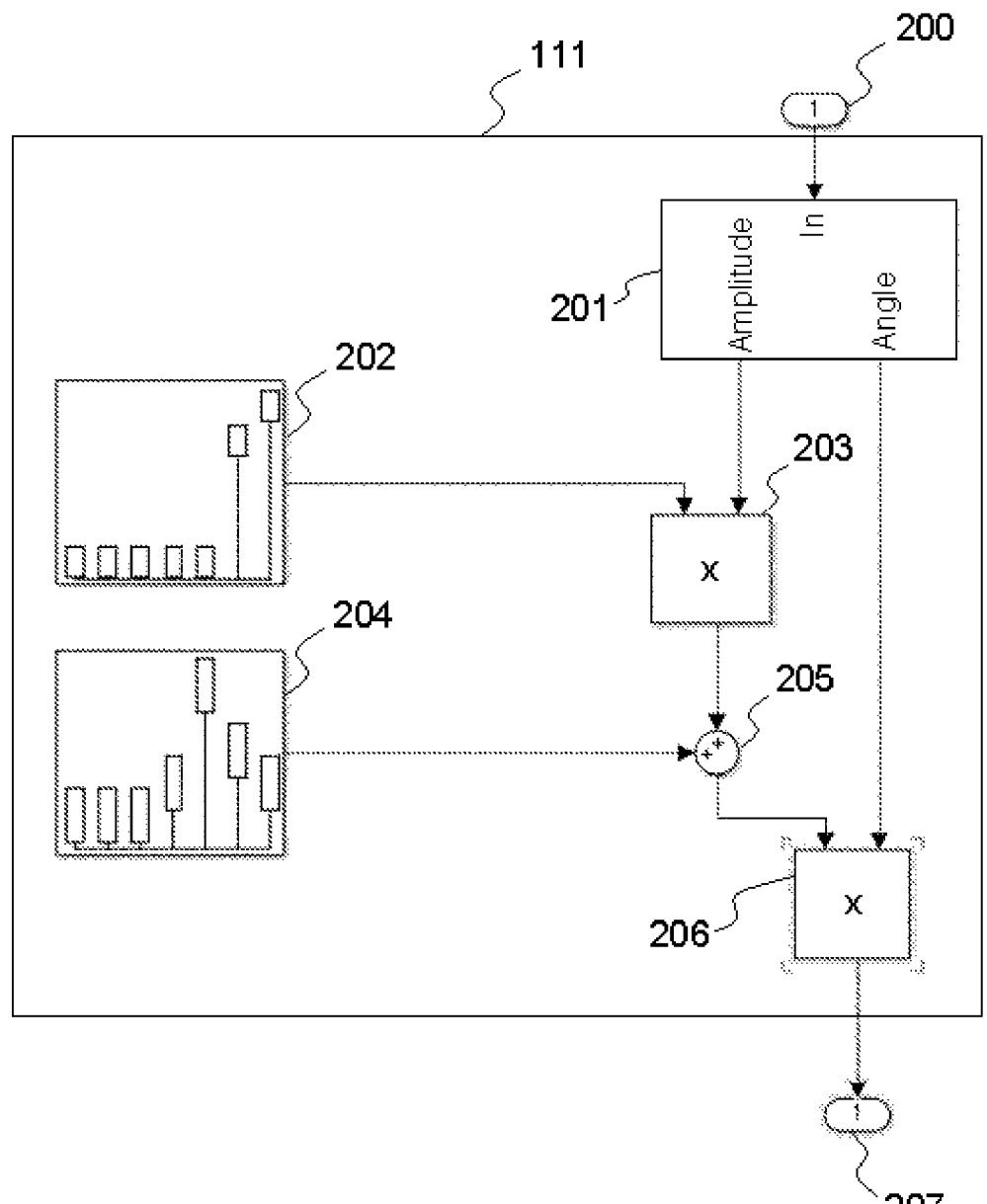

FIG. 2 explains in more detail the step 111 of generation of the AGC symbols according to the invention.

From the first modulated information symbol 200, the amplitude and the phase of this first symbol are recovered 201. A first sequence of coefficients 202 is generated and multiplied 203 by the amplitude of the first symbol 200. A second sequence of coefficients 204 is generated and added 205 to the result of the multiplication 203. Finally, the symbols obtained at the output of the addition 205 are realigned 206 with the phase of the first modulated information symbol 200.

In other words, the amplitude of the AGC symbols generated is a linear function of the amplitude of the first modulated information symbol 200 and the phase of the AGC symbols is constant for all the AGC symbols and is equal to the phase of the first modulated information symbol 200. The amplitude of the AGC symbols is chosen in this way because the modulation employed to modulate the information symbols is a linear modulation, for example a QAM (Quadrature Amplitude Modulation) or APSK (Amplitude and Phase-Shift Keying) modulation. To neutralize the influence of the first modulated information symbols on the sequence of filtered AGC symbols, it is advantageous for the AGC symbols to be themselves of linear amplitude as a function of the modulated information symbol or symbols.

The first sequence of coefficients 202 and the second sequence of coefficients 204 are determined in such a way as to obtain an amplitude level of the signal that is substantially constant over the portion of the signal corresponding to the AGC symbols filtered by the shaping filter.

An AGC symbol can be represented by the following relationship:

$C_i = xA_i + B_i$, with $C_i$ being an AGC symbol, $A_i$ being a coefficient of the first sequence 202, $B_i$ being a coefficient of the second sequence 204, x being the amplitude of the first information symbol 200 and i varying from 0 to N, N being the desired number of AGC symbols.

The coefficients $A_i$ and $B_i$ are determined such that the result of the filtering of the AGC symbols $C_i$ by the shaping filter is substantially constant over the duration of the AGC sequence.

This criterion can be formalized as the search for the minimum of the following function (f), in which $g(A_0, A_1, \ldots, A_n, B_0, \ldots, B_n, t, x)$ represents the result of the filtering of the AGC symbols at an instant t and $n_0$ is the target aimed for for the amplitude of the filtered signal.

$$f(A_0, A_1, \ldots, A_n, B_0, \ldots, B_n) = \sum_{t \in T} (g(A_0, A_1, \ldots, A_n, B_0, \ldots, B_n, t, x) - n_0)^2$$

Function (f) corresponds to the average energy, over duration T, of the deviation between the filtered signal and the target amplitude $n_0$.

In a variant embodiment of the invention, a number of modulated information symbols are used instead of just one. The use, as described above, of a modulated information symbol to construct the desired AGC symbols makes it possible to fight against the influence of the first information symbol on the filtered AGC sequence. By analogy, the use of a number of modulated information symbols to construct the desired AGC symbols makes it possible to fight against the influence of a number of information symbols on the filtered AGC sequence. Practically, the more distant an information symbol is in time from the AGC symbols, the more its influence decreases, which is why the preferred embodiment of the invention is that described above which uses only a single information symbol.

However, in the case where the invention is implemented by exploiting the influence of a number of information symbols, the amplitude of the AGC symbols is constructed using the following relationship:

$C_i = x_1 \cdot A_{1,i} + B_{1,i} + x_2 \cdot A_{2,i} + B_{2,i} + \ldots + x_m \cdot A_{m,i} + B_{m,i}$ where m is the number of modulated information symbols used, $x_1$ is the amplitude of the first information symbol and $x_2, \ldots x_m$ are the amplitudes of the other modulated information symbols, previously projected in the direction formed by the phase of the first information symbol.

The phase of the AGC symbols is taken to be constant, equal to the phase of the first modulated information symbol.

Figure 3A:
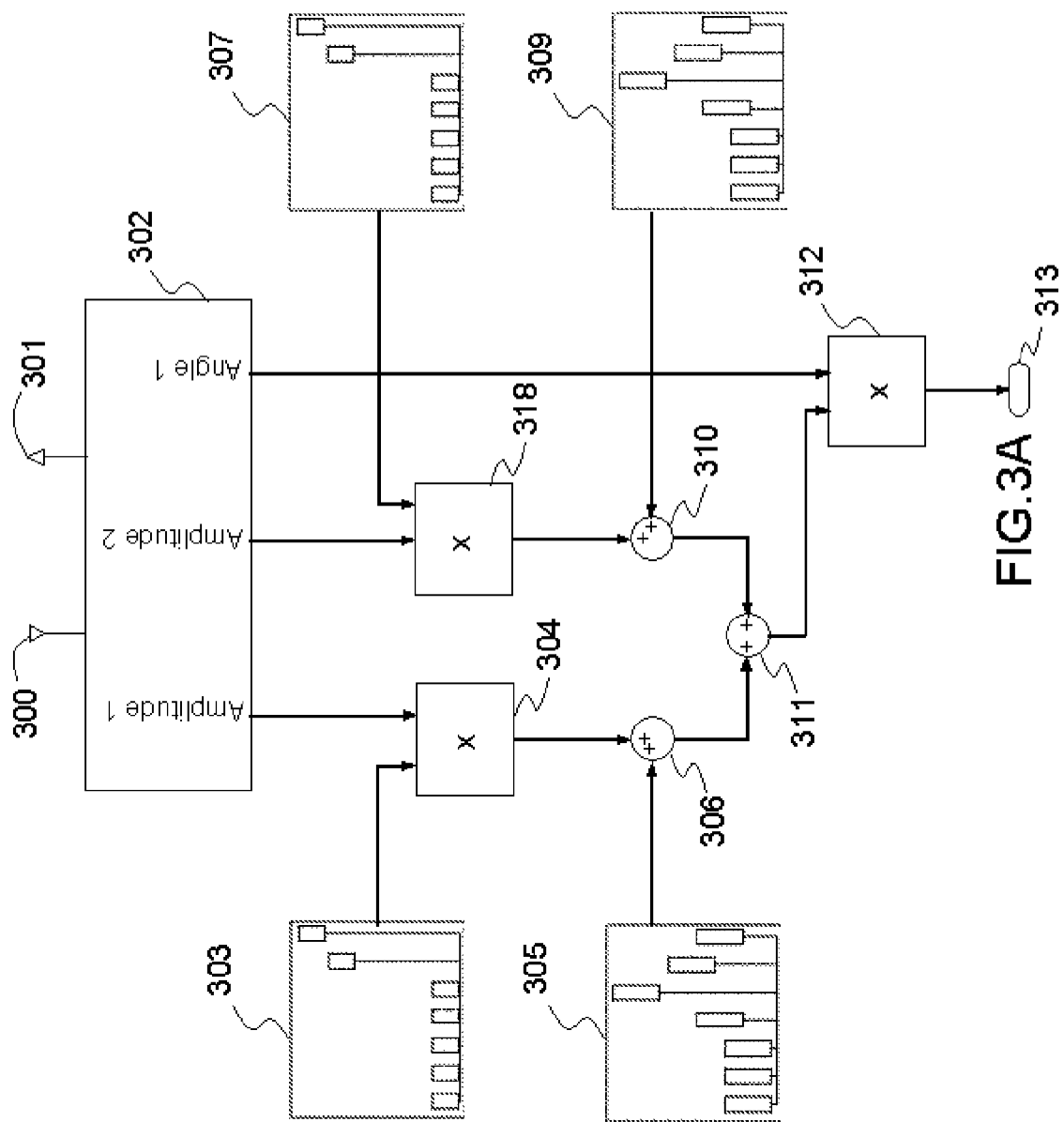

This embodiment is illustrated in FIG. 3a for the particular case of two modulated information symbols 300, 301.

In a step 302 of the method, the amplitude and the phase of the first information symbol 300 and the amplitude of the second information symbol 301 are extracted.

The amplitude of the second information symbol 301 is projected in the direction formed by the angle of the phase of the first information symbol 300. This operation is performed in such a way as to be able to perform coherent summations between two complex symbols which do not have the same phase.

Then, a linear function is applied to the amplitude of the first information symbol 300 from a first sequence of coefficients 303 and a second sequence of coefficients 305. The same operation is performed for the projected amplitude of the second information symbol 301 from a third sequence of coefficients 307 and a fourth sequence of coefficients 309. Ultimately, the results of the two linear operations are summed 311 to obtain the amplitude of the AGC symbols. The phase of the AGC symbols is taken to be equal to the phase of the first information symbol 301.

Figure 3B:
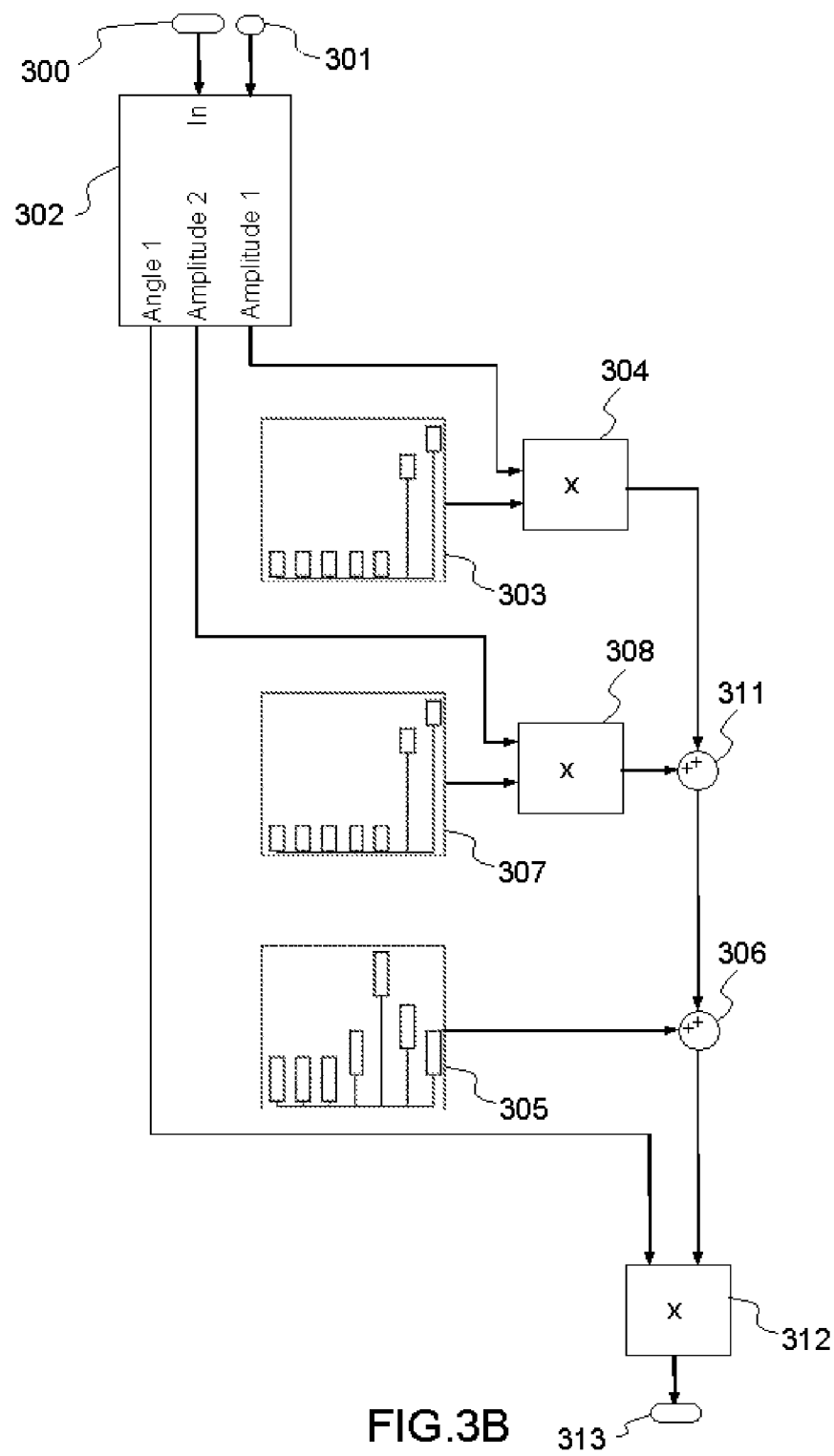

Advantageously, the second sequence 305 and the fourth sequence 309 can be replaced by one and the same sequence which is added directly with the result of the sum 311 of the two multiplications 304, 308. This variant embodiment is detailed in FIG. 3b.

With no loss of generality, the invention can also be implemented for more than two modulated information symbols.

In another variant embodiment of the invention, the symbols generated according to the invention can be positioned not at the start of frame but at the end of frame as represented by the reference 121 in FIG. 1.

One advantage to the limiting of the amplitude variations at the end of frame is that this induces a better spectral quality of the duly generated signal.

In the exemplary embodiments described above, a linear function of the amplitude of the modulated information symbol or symbols is used to calculate the AGC symbols.

With no loss of generality, it is also possible to use a nonlinear function or any deterministic function inasmuch as the calculated AGC symbols depend at least on a modulated information symbol.

The complex value of the AGC symbols can also be determined directly as a function of the complex value of the modulated information symbol or symbols without necessarily separately performing the calculation of the amplitude and the calculation of the phase of the AGC symbols.

Figure 4A:
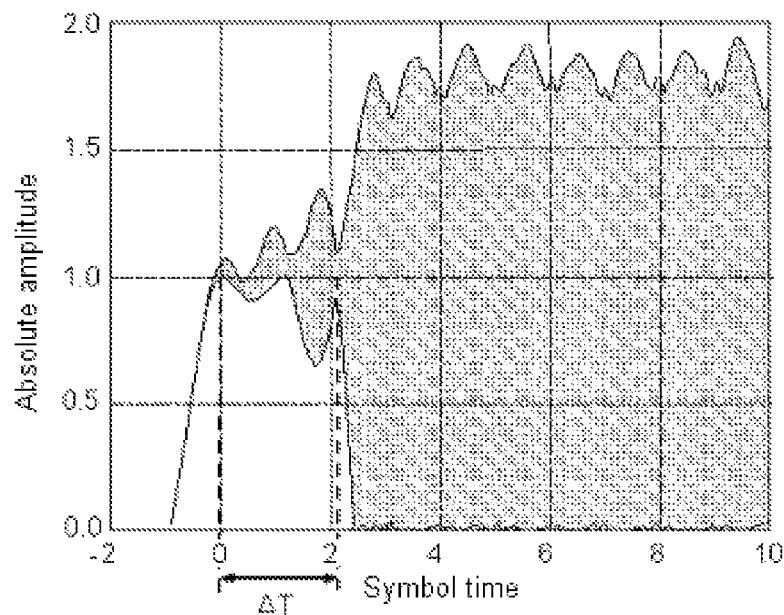
Figure 4B:
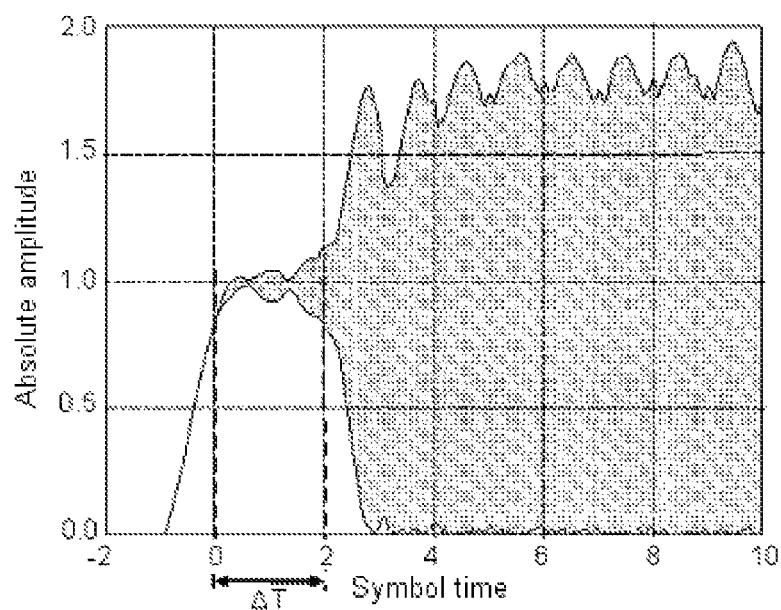

FIGS. 4a and 4b illustrate the results obtained through the implementation of the invention.

FIG. 4a shows the appearance of the amplitude of a signal as a function of time in the case where the AGC symbols are of any value and phase. It will be noted that, over the duration $\Delta T$ of the sequence dedicated to the automatic gain control, the amplitude variations are not negligible.

FIG. 4b shows the same temporal portion of the signal in the case where the invention is implemented to determine the AGC symbols. In this case, the amplitude variations on the AGC sequence are limited, which makes it possible to produce the automatic gain control with better accuracy.

The signal generated by application of the method according to the invention thus makes it possible to produce the automatic gain control with a better accuracy than for a signal generated with AGC symbols of any values.

The method according to the invention can be implemented by a transmitting equipment item. It can be implemented via a processor and a memory.

The processor can be a generic processor, a dedicated processor, an application-specific integrated circuit (also known as ASIC) or a field-programmable gate array (also known by the acronym FPGA).

The invention claimed is:

1. A method for generating a set of symbols, called automatic gain control (AGC) symbols, for use in an automatic control of an amplitude of a signal to be transmitted, said signal comprising said set of AGC symbols and at least one first information symbol modulated with a linear modulation, said method comprising the following steps:
   selecting, at a processor, at least one modulated information symbol adjacent to said AGC symbols in said signal, and
   determining, at the processor, a value of each AGC symbol of said set as follows:
   an amplitude of an AGC symbol is equal to a linear function of an amplitude of at least said modulated information symbol,
   a phase of the AGC symbol is equal to a phase of said modulated information symbol,
   wherein said linear function includes coefficients that are configured in such a way as to obtain an amplitude level of the signal that is substantially constant over a portion of the signal corresponding to said AGC symbols filtered by a shaping filter.

2. The method for generating AGC symbols according to claim 1, in which the coefficients of said linear function are determined as a function of the shaping filter and of a desired amplitude level over said portion of the signal.

3. The method for generating AGC symbols according to claim 1, in which a number of modulated information symbols adjacent to said AGC symbols in said signal are recovered and an amplitude of an AGC symbol is equal to a sum between:
   a linear function of an amplitude of the at least one first modulated information symbol adjacent to said AGC symbols in said signal, and
   another sum of linear functions of respective amplitudes of modulated information symbols, other than the at least one first modulated information symbol, projected in a direction formed by a phase of said first modulated information symbol.

4. The method for generating AGC symbols according to claim 1, in which said signal is formatted as a plurality of frames, said AGC symbols being positioned at a start or at an end of a frame.

5. The method for generating a signal to be transmitted, the method comprising:
   formatting a signal, at a processor, as a plurality of frames each comprising at least one sequence of automatic gain control (AGC) symbols and a sequence of information symbols modulated by a linear modulation, said AGC symbols and said information symbols being filtered by a shaping filter, said processor configured to obtain the at least one sequence of AGC symbols by:

selecting, at the processor, at least one modulated information symbol adjacent to said AGC symbols in said signal, and determining, at the processor, each AGC symbol of said sequence as follows:

an amplitude of an AGC symbol is equal to a linear function of an amplitude of at least said modulated information symbol, a phase of the AGC symbol is equal to a phase of said modulated information symbol, wherein said linear function includes coefficients that are configured in such a way as to obtain an amplitude level of the signal that is substantially constant over a portion of the signal corresponding to said AGC symbols filtered by a shaping filter.

6. The method according to claim 5, wherein the processor is configured to transmit said signal using a transmitting equipment based upon said selecting and said determining.

7. A transmitter comprising a processor and a memory, said processor configured to:

generate a signal to be transmitted, said signal being formatted as a plurality of frames each including at least one sequence of automatic gain control (AGC) symbols and a sequence of information symbols modulated by a linear modulation, said AGC symbols and said information symbols being filtered by a shaping filter, said at least one sequence of AGC symbols being obtained by the processor by:

selecting at least one modulated information symbol adjacent to said AGC symbols in said signal, and determining each AGC symbol of said sequence as follows:

an amplitude of an AGC symbol is equal to a linear function of an amplitude of at least said modulated information symbol, a phase of the AGC symbol is equal to a phase of said modulated information symbol, wherein said linear function includes coefficients that are configured in such a way as to obtain an amplitude level of the signal that is substantially constant over a portion of the signal corresponding to said AGC symbols filtered by a shaping filter.

\* \* \* \* \*